Patented Dec. 22, 1931

1,837,877

UNITED STATES PATENT OFFICE

JAMES F. McDOWALL, OF AKRON, OHIO, ASSIGNOR TO THE B. F. GOODRICH COMPANY, OF NEW YORK, N. Y., A CORPORATION OF NEW YORK

CORE PASTE

No Drawing.   Application filed May 31, 1930. Serial No. 458,901.

This invention relates to the art of casting metals and more particularly to the art of preparing the molds in which metals are cast.

In the casting of hollow metal articles the portion of the mold which defines the cavity of the articles, the so-called core, is usually made separately from the remainder of the mold which defines the exterior surfaces of the article, and is associated therewith at some time previous to the pouring of the metal. Such cores are conveniently made in sections which are assembled with the assistance of an adhesive paste before they are assembled in their place in the mold. Indeed, if the core does not have a very simple shape, it is indispensable that it should be so made in sections.

The cores are ordinarily made of sand mixed with a waterproof binder such as linseed oil, shaped in a form or mold, and subsequently baked to harden the binder. Many such cores are practically inalterable under ordinary storage conditions, and may be placed in molds made from damp sand, so-called green sand molds, without undergoing sensible deterioration due to the absorption of moisture. However, the flour paste frequently used for joining the sections of the core rapidly absorbs water, even though it has been thoroughly dried by baking, eventually weakening to such an extent that the sections of the core fall apart. Even if the metal is poured before the core paste is too greatly weakened, the absorbed moisture rapidly volatilized by the heat of the molten metal, added to the gaseous products of decomposition of the paste and the core-binder, frequently gives rise to blow-holes and other defects in the castings.

According to this invention, a built-up core is produced in which the above-mentioned defects are all avoided, in which the bond between the sections is as strong or as stronger than the body of the core, which is not sensitive to moisture, and which is easy and inexpensive to make. This invention consists in adhering the sections of the cores with a novel paste composition comprising a solution of an adhesive binder in a volatile organic solvent, and a considerable proportion of a flake pigment. The adhesive binder alone is not satisfactory, since its solutions when thinned to a satisfactory consistency are sufficiently fluid to penetrate the porous core by virtue of its capillary attraction, leaving the surface dry and non-adhesive. The flake pigment lends a body to the solution, and the particles tend to interleaf at the surface of the core and prevent undue penetration of the paste into the porous structure of the core.

The adhesive binder employed is preferably a tough, heat-plastic, balata-like rubber isomer, such as that prepared by the reaction of rubber with sulphonic acids, and described by Harry L. Fisher in the United States Patent No. 1,605,180, granted November 2, 1926. These rubber isomers have properties varying from those of vulcanized rubber, to those of hard balata, or even of shellac. They are soluble in the ordinary rubber solvents, including benzene, carbon tetrachloride, chloroform, tetraline, gasoline, etc. When purified, they contain only carbon and hydrogen in the same ratio as the rubber from which they were prepared, but are chemically less unsaturated than rubber. They may be prepared by various different methods, of which that disclosed in the above-mentioned patent is an illustration, hence the term "tough, heat-plastic, artificial rubber isomers" will hereinafter be employed to include substances which contain carbon and hydrogen in the same ratio as rubber, but which are chemically less unsaturated than rubber, regardless of the particular method by which they are prepared. Other soluble rubber derivatives such as chlorinated rubber, or the natural isomers of rubber known as guttapercha and balata, or even solutions of unvulcanized rubber, may be substituted for the artificial rubber isomers mentioned above, although not with such outstandingly superior results. Solutions of other adhesive binders, such as solutions of shellac in alcohol, or of pitch or tar in gasoline or benzene may likewise be employed.

The flake pigment may be flake mica, flake graphite, aluminum flake, or any other pigment possessing a flaky structure and capable of leafing to prevent undue penetration of the suspending fluid into capillary pores. The flakes need not be particularly large in order to perform their function of bridging the pores, 150 mesh particles having been found to impart a smooth consistency to the paste which permits easy handling and application, and at the same time are capable of maintaining the greater portion of the paste at the surface, even of a very porous, open structure, permitting the adhesive binder to perform its function of uniting the core sections.

In a preferred embodiment of the invention 1 part by weight of the tough, balata-like artificial rubber isomer mentioned above is dissolved in 5 parts of gasoline or an equal volume of any other volatile solvent capable of dissolving the said isomer, and 3 parts of flake mica are stirred into the liquid. The product is a smooth viscous liquid which is readily brushed or smeared over the adjoining faces of the core sections, but which does not penetrate the core to any great extent. The coated surfaces are brought in contact before the paste dries, the rapid evaporation of the solvent causing the binder to harden quickly and develop its full adhesive strength. No baking is required, the assembled core being ready for use after only a short period of air drying.

The proportions given above correspond to a mixture of approximately equal volumes of adhesive binder and flake pigment, the density of the mica being about three times that of the rubber isomer, but good results may likewise be secured with other proportions. In general it is preferred to employ the flake pigment in the proportion of from ½ to 2 times the volume of the adhesive binder, and to thin with a solvent until the desired rather viscous or syrupy consistency is attained. The precise proportion employed will depend to some extent on the size of the pigment particles, as well as on the range of sizes found in the pigment which is used.

While I have herein disclosed certain preferred manners of performing my invention, I do not thereby desire or intend to limit myself solely thereto, for, as hitherto stated, the precise proportions of the materials utilized may be varied and other materials having equivalent properties may be employed if desired without departing from the spirit and scope of the invention as defined in the appended claims.

I claim:

1. A core paste comprising a solution of an adhesive binder in a volatile organic solvent, and a flake pigment suspended therein.

2. A core paste comprising a solution in a volatile organic solvent of a binder selected from the class comprising rubber and soluble rubber derivatives, and a flake pigment suspended therein.

3. A core paste comprising a solution of a thermoplastic rubber isomer in a volatile organic solvent, and a flake pigment suspended therein.

4. A core paste comprising a solution of a tough, heat-plastic, artificial rubber isomer in a volatile organic solvent, and a flake pigment suspended therein.

5. A core paste comprising a solution of a tough, heat-plastic, artificial rubber isomer in a volatile organic solvent, and a flake pigment suspended therein in the proportion of from ½ to 2 times the volume of the said rubber isomer.

6. A core paste comprising a solution of a tough, heat-plastic, artificial rubber isomer in a volatile organic solvent, and flake mica suspended therein.

7. A core paste comprising a solution of a tough, heat-plastic, artificial rubber isomer in a volatile organic solvent, and flake mica suspended therein in a proportion of approximately equal volumes of the said rubber isomer and the flake mica.

8. The process of making a foundry core which comprises separately molding the parts of the core, and uniting them by means of a paste comprising a solution of an adhesive binder in a volatile organic solvent, and a flake pigment suspended therein.

9. The process of making a foundry core which comprises separately molding and baking the parts of the core, and uniting them by means of a paste comprising a solution of a thermoplastic rubber isomer in a volatile organic solvent, and a flake pigment suspended therein.

10. A foundry core comprising separately molded core sections and a layer of a composition comprising an adhesive binder and a flake pigment uniting the said core sections.

11. A foundry core comprising separately molded core sections and a layer of a composition comprising a thermoplastic artificial rubber isomer and a flake pigment uniting the said core sections.

12. A foundry core comprising separately molded baked sand core sections and a layer of a composition comprising a thermoplastic artificial rubber isomer and powdered mica uniting the said core sections.

In witness whereof I have hereunto set my hand this 29th day of May, 1930.

JAMES F. McDOWALL.